Nov. 4, 1969  D. P. MARQUIS  3,476,419
IDLER ARM ASSEMBLY
Filed Aug. 23, 1967
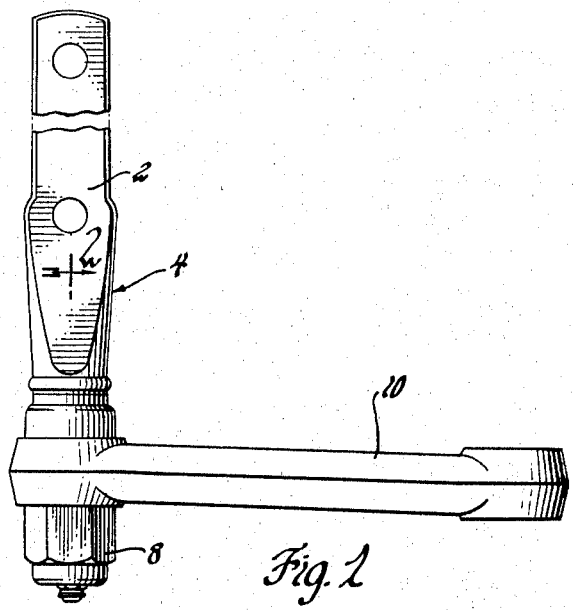
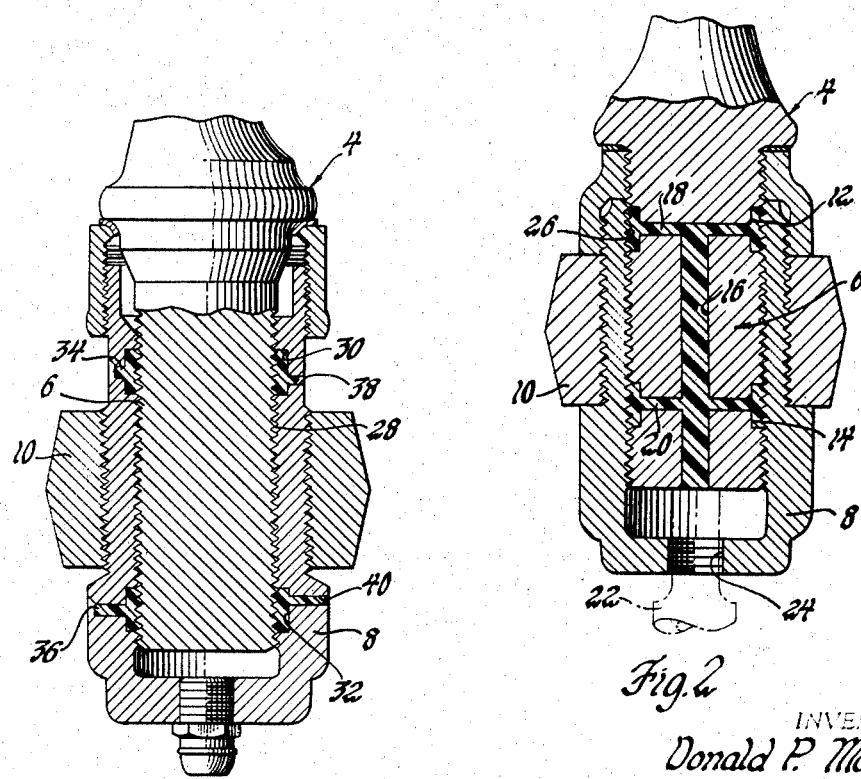
Fig. 3
Fig. 2
INVENTOR.
Donald P. Marquis
by W. A. Wagner
ATTORNEY United States Patent Office 3,476,419
Patented Nov. 4, 1969

3,476,419
IDLER ARM ASSEMBLY
Donald Peter Marquis, Saginaw, Mich., assignor to General Motors Corporation, Detroit, Mich., a corporation of Delaware
Filed Aug. 23, 1967, Ser. No. 662,807
Int. Cl. F16b 7/00; F16d 1/00
U.S. Cl. 287—117                            1 Claim

ABSTRACT OF THE DISCLOSURE

An idler arm assembly having one of a pair of threadably cooperating members provided with axially spaced annular recessed portions in which a synthetic resin is injected to effect optimum precision engagement with the threads of the other member.

SUMMARY

This invention relates to threaded pivot assemblies in which axially spaced high precision thread engagement portions are provided by in situ injected plastic elements.

For many years the so-called threaded pivot has enjoyed widespread utilization in various applications including idler arm assemblies for vehicle steering linkage. In the typical threaded pivot assembly, a pin and sleeve are formed with mating threads which allow relative rotary movement while resisting axial thrust. In typical high volume production of such assemblies, the respective threads of the pin and sleeve are applied by well known thread rolling processes. While dimensional variation in successive parts is relatively slight, in practice, particularly in applications such as idler arm assemblies, selective mating of the cooperating members is required in order to assure the degree of precision fit necessary to achieve an assembly which is free of play or binding. This process of selection naturally is quite time consuming and adversely affects the economy essential in volume production of such assemblies. Additionally, even when the greatest care is exercised in selecting the cooperating threaded elements, something less than ideal precision engagement may nevertheless occur with some degree of frequency.

An object of the present invention is to provide a threaded pivot assembly incorporating means for eliminating the need for hand selection of mating parts while at the same time assuring an optimum degree of precision fit therebetween.

In accordance with the general features of the invention, the desired objective is attained by forming annular recesses in one of the two threadably cooperating members and injecting a synthetic resin material therein which upon hardening provides a plurality of threads intimately cooperating with the adjacent threads of the other member, thereby producing an essentially zero lash relationship and complete freedom from angular play between the two cooperating members.

The foregoing and other objects, advantages and features of the invention will become more readily apparent as reference is had to the accompanying specification and drawing wherein:

FIGURE 1 is an elevational view of an idler arm assembly incorporating the invention;

FIGURE 2 is an enlarged sectional elevational view of the pivot assembly portion of the idler arm assembly illustrating the details of construction thereof; and FIGURE 3 is a sectional elevational view similar to FIGURE 2 illustrating a modified form of the invention.

Referring now to the drawing, there is shown in FIGURE 1 an idler arm assembly in which the reference numeral 2 designates the flattened attachment portion of the idler support 4. At its opposite end, support 4 is formed with a threaded shaft portion 6 (FIGURE 2) having assembled therearound a cooperating sleeve or bushing 8 adapted for relative rotation therewith. Bushing 8 in turn is connected to an idler arm 10 extending in a plane normal to the axis of the bushing.

To accomplish uniform optimum precision thread engagement between shaft 6 and bushing 8 in accordance with one embodiment of the invention, as seen best in FIGURE 2, the threaded shaft portion 6 is formed with axially spaced apart annular recesses 12 and 14 which communicate with a central bore 16 via one or more radial branch passages 18 and 20. Subsequent to assembly of bushing 8 around shaft 6, a synthetic resin such as the acetal resin marketed under the trade name "Delrin" is injected into passage 16 by inserting an injector nozzle 22 through the threaded aperture 24 at the base of bushing 8. Injected resin material flows through passage 16 and branch passages 18 and 20 and ultimately totally occupies the annular recesses 12 and 14 so that intimate precision mating engagement with the adjacent threads 26 formed internally on bushing 8 is achieved. As soon as the resin material hardens, the annular portions within recesses 12 and 14 are keyed or locked in fixed angular relationship with the remaining threads 28 of shaft 6 by the radially projecting integral portions occupying branch passages 18 and 20. Consequently, subsequent relative angular movement between shaft 6 and bushing 8 incident to normal operation of the idler assembly assures angular movement of the thread faces of the plastic material in concert with the adjacent threads of shaft 6. It will be understood that subsequent to injection of the plastic material, nozzle 22 is withdrawn and the threaded aperture 24 is closed by installation of a conventional grease fitting, not shown. It will, of course, be apparent that maximum efficacy of the invention is dependent upon selection of suitable plastic material in terms of wear capability, dimensional stability and shrinkage characteristics. While as previously mentioned, Delrin has proved to be suitable, it is to be understood that the invention is in no sense limited thereto. Naturally, it is equally important that the material utilized exhibit no tendency toward adhesion with the adjacent metal surfaces. In connection with the latter, it has been found that freedom from adhesion is further enhanced by precoating the entire thread area of the sleeve and shaft prior to injection of the resin.

In FIGURE 3, there is shown a modified form of the invention which enables elimination of a central bore 16 and branch passages 18 in shaft 6. In the embodiment shown in FIGURE 3, annular recesses 30 and 32 are formed in bushing 8 rather than shaft 6 and access for resin injection purposes is achieved by short branch passages 34 and 36 extending through the side walls thereof. In addition to eliminating the machining operations involved in forming the bore 16 and passages 18 of the embodiment of FIGURE 2 and the attendant additional volume of resin material required to achieve filling of the recesses, the embodiment of FIGURE 3 affords a more economical means of increasing the degree of mechanical interlocking engagement by provision of additional drilled passages such as 38 and 40 in which resin material will flow as an incidence of filling the recesses 30 and 32.

From the foregoing it will be seen that utilization of the invention of either of the embodiments disclosed enables high volume production of an idler arm assembly having high precision threaded bearing engagement while totally eliminating the previously time consuming operation of hand selection of bushings and pivot shafts, while at the same time retaining the essential benefits which are implicit in conventional threaded pivot assemblies.

While two embodiments of the invention have been shown and described, it will be apparent that other changes and modifications may be made therein. It is, therefore, to be understood that it is not intended to limit the invention to the embodiments shown.

I claim:
1. A threaded pivot assembly providing smooth rotational engagement between mating standard threads as normally produced by common thread rolling processes comprising:
   a support having an externally threaded portion with axially spaced annular relieved portions;
   a passage means within said support communicating with and interconnecting said relieved portions;
   a bushing having an internally threaded portion operatively engaging the threads of said externally threaded portion, said bushing including an end wall having an aperture providing access to said passage means and being adapted to receive a grease fitting; and
   in situ injection molded dimensionally stable plastic bearing means occupying said axially spaced annular relieved portions and cast against said bushing's internal threads providing threaded closely mating engagement between said support and said bushing and aligning said support within said bushing, said relieved portions enabling adequate injection molding without precise pre-injection alignment of said support within said bushing, said bearing means extending into said passage means providing mechanical interlocking engagement between the bearing means and the support so as to provide positive angular orientation assuring smooth operation of the pivot assembly.

References Cited

UNITED STATES PATENTS

| 2,677,149 | 5/1954 | Fineran | 151—7 X |
| 2,810,117 | 10/1957 | Abbott | 287—127 X |
| 2,841,412 | 7/1958 | Mineck | 287—93 X |
| 3,081,644 | 3/1963 | Hudgens et al. | |

FOREIGN PATENTS

| 930,718 | 7/1963 | England. |
| 339,436 | 8/1959 | Switzerland. |

DAVID J. WILLIAMOWSKY, Primary Examiner
W. L. SHEDD, Assistant Examiner

U.S. Cl. X.R.
287—52.02, 52.04